United States Patent Office 3,306,730
Patented Feb. 28, 1967

3,306,730
METHOD OF PREPARING A NON-CAKING SLOW RELEASE FERTILIZER
Earl W. Malmberg, Wilmington, Del., and Wesley R. Cherry, Prospect Park, Pa., assignors to Sun Oil Company, Philadelphia, Pa., a corporation of New Jersey
No Drawing. Filed May 8, 1964, Ser. No. 366,162
6 Claims. (Cl. 71—64)

This invention is a method of preparing slow release fertilizer particles having improved anti-caking properties. More particularly the invention is a method of rendering certain types of slow release fertilizers non-caking, the fertilizers to which the method is applicable comprising a dispersion of solid fertilizer in solid wax. Particles of such a fertilizer are rendered non-caking by tumbling a mixture of such particles and an inert finely divided solid at an elevated temperature. During the tumbling particles of inert finely divided solid are embedded in the wax at the surface of the fertilizer particles and the tumbling is continued until the entire surface of the fertilizer particles is covered with inert solid. The resulting particles contain a core which is a dispersion of a solid fertilizer in solid wax. The core is overlaid with a thin continuous adherent film of inert solid. Because of this surface film the particles show no tendency to stick together, i.e., cake, when stored under many of the conditions of temperature and pressure normally encountered in actual commercial handling.

The need for slow release fertilizers is well known. A slow release fertilizer is resistant to leaching by water and provides nutrients to the plants being fertilized at a predetermined rate irrespective for the most part of rainfall and other climatic conditions. Several such fertilizers have been proposed. One, for example, can be prepared by dispersing the fertilizer in molten wax, forming the dispersion into small fertilizer size particles by means of, say, a mold, and allowing the particles to cool below the melting point of the wax. The resulting particles are a dispersion of solid fertilizer particles in solid wax. When submerged in water the fertilizer is leached out of the particles only gradually, hence the particles are a slow release fertilizer. The particles can be any of the conventional solid fertilizer compounds such as sodium or potassium nitrate, potassium sulfate, urea, mono- or di-ammonium phosphate, superphosphate or triple superphosphate, ammonium nitrate, potassium phosphate, ammonium sulfate, calcium cyanamide, potassium chloride, etc. Where it is desired that the fertilizer contain a source of nitrogen urea is preferred because it contains a higher nitrogen content than the other nitrogen fertilizers mentioned. In a copending application, Serial No. 308,251, filed September 11, 1963 now Patent No. 3,252,786, slow release urea fertilizer compositions have been disclosed which have a higher water resistance than a dispersion of urea in wax as described above. These improved compositions comprise a dispersion of urea in wax, the wax having rosin and optionally, but preferably, asphalt dissolved therein. These compositions are described in more detail subsequently.

Any slow release fertilizer which comprises a dispersion of a solid fertilizer compound in solid wax has the disadvantage that the particles thereof generally tend to cake or congeal under some of the conditions normally encountered during normal storage and shipment of the fertilizer. The wax component of such fertilizers often has a melting point of 125°–150° F. Such temperatures, however, are not unknown in warehouses and boxcars during the summer. Even if the melting point of the wax is actually above the temperatures encountered during storage and shipment, the wax often becomes soft enough at these latter temperatures so that when bags of discrete particles comprising a dispersion of fertilizer in wax are stacked in piles 5–30 bags high, as is normal procedure, the pressure on the particles near the bottom of the pile is sufficient to cause these particles to agglomerate into large lumps.

We have now found a method of preparing slow release fertilizer compositions which although they are a dispersion of solid fertilizer in solid wax do not possess the above-mentioned disadvantage. Our compositions are essentially non-caking at most of the conditions of temperature and pressure normally encountered in commercial distribution.

The compositions prepared by our method are, of course, in the form of small, discrete fertilizer size particles. Each particle contains a core which is overlaid with a thin continuous adherent solid film which substantially completely covers the surface of the core. The core is a dispersion of solid fertilizer in solid wax. The wax component of the dispersion will in many cases contain one or more additive dissolved therein. The surface film covering this core is an inert solid material. The film is formed by tumbling a mixture of (1) discrete particles comprising a dispersion of solid fertilizer in solid wax and (2) an inert finely divided solid. The tumbling is carried out at an elevated temperature, the result of which is that the wax phase of the discrete fertilizer particles is softened and the inert finely divided solid becomes embedded in the surface of the fertilizer particles over the entire surface thereof.

Our method of rendering discrete slow release fertilizer particles non-caking by the formation thereon of a continuous adherent film of inert solid is best illustrated by first describing the preparation of the particles which have no surface film but which are a dispersion of solid fertilizer in solid wax, herein referred to as the base fertilizer particles, and then describing the treatment of such particles in order to form the surface film thereon.

The base fertilizer particles can be prepared in any suitable manner. For example, the wax is heated to above its melting point, the fertilizer is added to the molten wax and the mixture is stirred in order to uniformly disperse the fertilizer in the molten wax. The resulting dispersion is then shaped into fertilizer size particles by means of a pellet mold, etc., and the resulting particles are allowed to cool to a temperature below the melting point of the wax. The resulting particles are a dispersion of solid fertilizer in solid wax. Substantially all the particles of fertilizer are surrounded by and encased in wax. The fetilizer can be any conventional fertilizer compound or a mixture of several such compounds, examples of those in frequent use at the present time having been given hereinbefore. Urea is the preferred fertilizer ingredient. The wax component of the slow release fertilizer can be of any type, i.e., animal, vegetable, or mineral. Examples of suitable waxes include paraffin wax, microcrystalline wax, beeswax, carnauba wax, montan wax, ozocerite wax, etc. Because of their ready availability paraffin and microcrystalline waxes are preferred. These two waxes are described in more detail subsequently. Between paraffin and microcrystalline wax the former is preferred. In the subsequent discussion of the preparation of the base fertilizer particles it will be assumed that the fertilizer component thereof is urea and that the wax component thereof is paraffin wax.

In forming the base fertilizer particles it is desirable for several reasons that the urea be of small particle size. One reason is that the uniformity of the rate at which the urea is released to the plants when the non-caking fertilizer is ultimately placed in the soil is directly proportional to the uniformity of the fertilizer particle. The uniformity of the fertilizer particle is increased, of course, as the urea particle size decreases. Another reason is that the surface film ultimately formed on the surface of the base particles is formed by embedding inert solid particles in the wax phase at the surface of the base particles. This means that the distribution of wax at the surface of the base particles should be substantially uniform, or, conversely, the distribution of urea should be substantially uniform. This is achieved by using small particle size urea. Preferably the urea dispersed in the paraffin wax has a particle size of smaller than 100 mesh, more preferably smaller than 200 mesh. All mesh sizes herein are by U.S. Standard Sieves.

When the urea employed is smaller than about 100 mesh it often tends to agglomerate into lumps which makes it somewhat difficult to form a uniform dispersion of the urea in the wax in conventional agitated mixing vessels. This problem is readily overcome by forming an initial gross dispersion of relatively large size urea, such as commercial crystal urea which is mainly larger than 100 mesh, in the molten wax, and then passing this gross dispersion through a roller mill having a roller clearance sufficiently low to subdivide the urea particles to the desired sized. By this technique the particle size of the urea dispersed in the wax is easily reduced to as small as 200 mesh or even 400 mesh. The dispersion discharged from the roller mill is usually a dry solid because the wax has solidified but upon reheating the dispersion the wax melts again.

When urea is dispersed in molten paraffin wax, preparatory to forming small fertilizer particles, the urea and wax often react to form an adduct before the dispersion can be shaped into small particles. The time required for this reaction to take place depends mainly upon the urea particle size. When the urea is larger than 100 mesh adduction may not occur for 15–20 minutes. On the other hand, if the urea is smaller than 100 mesh, say 200 mesh, adduction usually occurs in less than 5 minutes. Since this may not be enough time to form the dispersion into small particles it will usually be desirable to include in the paraffin wax an adduct inhibitor which is effective to prevent or at least substantially delay the adduct reaction. Suitable inhibitors which can be used are wax soluble polymers of vinyl type compounds such as polyethylene, polyisobutylene, copolymer of ethylene and vinylacetate, etc.; wood rosin in any of its various conventional forms; fatty acid nitrogren compounds such as fatty amides, fatty amines; alkanol amines such as triethanol amine; wax soluble condensation polymers such as wax soluble alkyd resins; microcrystalline wax; and the like. The amount of inhibitor used to prevent adduction is usually about 1–20%, preferably 3–10%, although higher amounts can also be used. All percentages herein are by weight. In some cases, mentioned hereinafter, such higher amounts are sometimes desirable.

It may also be desirable in some cases to incorporate certain other additives in the paraffin wax prior to dispersing urea therein. In the aforesaid copending application two additives, rosin and asphalt, are disclosed which when dissolved in the wax component of a slow release fertilizer comprising a dispersion of urea in petroleum wax, i.e., paraffin or microcrystalline wax, improve the properties thereof. The incorporation of either of these additives in a urea-petroleum wax base fertilizer particle is a preferred embodiment of our present invention. The rosin, which can be wood, gum, or tall oil rosin, and which can be unmodified rosin or any of the various rosin derivatives such as polymerized rosin, hydrogenated rosin, rosin esters, metal salts of rosin, etc. serves as an adduct inhibitor and also improves the water resistance of the fertilizer. For this latter purpose two types of rosin are preferred, although any others can also be used. One preferred rosin is the partially oxidized calcium salt of polymerized wood rosin, the salt containing (before oxidation) 7–10% calcium. This material is available in the unoxidized form as an article of commerce or can be made by known methods. Partial oxidation is disclosed in the aforesaid application as a means of further improving the effectiveness of certain rosins for improving the water resistance of a urea-petroleum wax slow release fertilizer. The partial oxidation can be effected at any temperature but should be equivalent to oxidation in the presence of air, at atmospheric pressure, and at 140° F. for a time sufficient to improve the water resistance of the fertilizer composition when the latter is submerged in water. Water resistance is determined by submerging the particles in water and determining the amount of urea dissolved therein after 72 hours. Preferably the oxidation time is 1–8 days, more preferably 2–6 days. Prior to oxidation the rosin should be subdivided to 10–20 mesh. The other preferred rosin is polymerized wood rosin partially oxidized to the same extent as described for the calcium salt of polymerized wood rosin.

The other additive disclosed in the aforesaid application is asphalt. If rosin is present in the wax, asphalt effects a further improvement in the water resistance of the resulting fertilizer. Regardless of whether rosin is present or not, the asphalt renders the dispersion of urea in wax substantially more fluid than it is without the asphalt. When small size, say 200 mesh, fertilizer particles, urea or otherwise, are dispersed in wax the resulting dispersion is very viscous, having a putty-like consistency. However, if asphalt is present in the wax when the dispersion is formed, the subsequent dispersion is very fluid, having about the fluidity of paint or melted chocolate.

The amount of rosin normally employed will be a minor amount, i.e., less than 50%, based on the total weight of wax and rosin if asphalt is absent, or based on the total weight of wax, rosin, and asphalt where the latter is also used. Preferably the amount of rosin is 2–35%, more preferably 3–20%. All percentages and parts herein are by weight. Where asphalt is used to fluidize a dispersion of urea in wax it should be used in amount of 1–20%, preferably 3–10%, by weight of the wax. Where asphalt is incorporated into the wax to improve the fertilizer water resistance, in which case rosin will also be present, the amount of asphalt should be a minor amount, based on the total weight of wax, rosin, and asphalt, effective to improve the fertilizer water resistance, preferably 0.25–40.0%, more preferably 3–20%.

In dispersing urea in wax to form the base particles of the invention, the relative amounts of urea and wax phase, the wax phase being defined as the wax plus any additives dissolved therein, will depend upon the desired water resistance of the ultimate non-caking fertilizer particles, upon whether the ultimate particles are to contain other fertilizer ingredients in addition to urea, and upon other factors mentioned hereinafter. If there is to be only one fertilizer ingredient, e.g., urea, in the base particles the amounts of urea and wax phase will normally be 50–75% urea and 25–50% wax phase, the percentages being based on the total weight of the base particles. In most cases the amount of urea will be 50–70% and the amount of wax phase will be 30–50%. If any additives are present in the wax the wax phase will normally contain a major amount, i.e., over 50%, of wax and a minor amount, i.e., less than 50%, of additives.

The effect of (1) the total amount of wax phase in the base fertilizer particles and (2) the amount of additives in the wax phase on the ability to form a non-caking surface film on the base particles by the method of the invention is described in more detail subsequently.

If the base fertilizer particles are to contain a plurality of solid fertilizer ingredients, such as any of those previously mentioned, the total amount of fertilizer ingredients will still normally be 50–75% and the amount of wax phase will normally be 25–50%. In most cases the total fertilizer ingredients will be 50–70% and the amount of wax phase will be 30–50%, the percentages again being based on the total weight of the base particles. However, the actual amount of any single fertilizer ingredient, e.g., urea, in the base particles may be relatively low. For example, a slow release 5-15-10 complete fertilizer, i.e., a slow release complete fertilizer containing 5% nitrogen as N, 15% phosphorus as $P_2O_5$, and 10% potassium as $K_2O$, all by weight of the total composition, might contain 10.7% urea, 32.6% triple superphosphate, 18.5% potassium sulfate, and 38.2% wax phase. Usually the amount of any single fertilizer compound, e.g., urea, in the base particles will be at least 10% based on the total weight of base particles more frequently at least 20%.

Thus, considering both the case where a specific fertilizer compound, e.g., urea, is the sole fertilizer ingredient and the case where it is one of a plurality of fertilizer ingredients, the amount of urea or any other single fertilizer compound will be 10-75%, usually 10-70%, more frequently 20-70% and the wax phase will usually be 25-50%, more frequently 30-50%.

It was mentioned previously that the wax used in forming the base particles is preferably paraffin or microcrystalline wax, more preferably paraffin wax. These terms are used herein in accordance with their conventional meanings. They are the only waxes obtainable from petroleum, and moreover, they are only obtained from petroleum, hence they are identified generically as petroleum wax. The differences and similarities between these two kinds of waxes are well known to those skilled in the art and are summarized in Bennett, Commercial Waxes, Chemical Publishing Co., (1950), pp. 84-88. Both paraffin and microcrystalline waxes contain mainly saturated paraffin hydrocarbons, the former containing mainly straight chain paraffins while the latter contains a substantial amount of branched chain paraffins. Some typical properties of paraffin and microcrystalline waxes are shown in Table I below.

TABLE I

| Property | Paraffin Wax | Microcrystalline Wax |
| --- | --- | --- |
| Molecular Weight | 250-500 | 500-800 |
| Melting Point (ASTM D-127), °F | 110-165 | 140-210 |
| Viscosity at 210° F. (ASTM D-446), S.U.S. | 30-50 | 60-100 |
| Penetration at 77° F. (ASTM D-1321, 100 g., 5 sec.), mm | 5-25 | 5-25 |

It is apparent from the data in Table I that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous. Preferably the paraffin wax used in the compositions of the invention has a melting point, viscosity, and penetration within the ranges specified in Table I. More preferably it has a melting point in the range of 110°-140° F. All wax properties mentioned herein are by the appropriate tests indicated in Table I.

The base particles, prepared in a manner such as that described above, are then rendered non-caking by a method which comprises tumbling the base particles in admixture with a finely divided inert solid, the tumbling being at an elevated temperature.

The tumbling can be carried out in any suitable apparatus so long as same is a tumbling apparatus. Tumbling of solids means, of course, that the solids are turned end over end in falling or in flight. One suitable apparatus comprises a hollow cylinder closed at each end and rotating about its longitudinal axis, the latter being positioned horizontally. Preferably the cylinder is baffled so as to result in more motion of the solids being tumbled. Although tumbling of two solids results in, of course, the solids being mixed, most conventional agitated mixing vessels are unsuitable for the present purpose. One reason is that the method of the invention is conducted at an elevated temperature sufficient to soften the wax phase of the base particles. Any direct contact of a conventional agitator and the base particles results in continuous severe deformation of particles. If inert solid is present during such deformations the end result is base particles having inert solid distributed throughout the base particle rather than distributed only on the surface of the base particle. Distribution only on the surface of the particle is achieved by tumbling.

The manner in which the adherent continuous solid film is formed is best described as follows. The wax phase of the base fertilizer particles is softened during the tumbling by conducting the tumbling at an elevated temperature. During the tumbling the base fertilizer particles and the particles of the finely divided inert solid are brought into contact with each other and with the walls of the tumbling apparatus. Such contact is inherent in the tumbling. If the wax is not softened some of the particles of inert finely divided solid would cling to the surface of the base particles but this type of surface film, if it be properly referred to as a film, is discontinuous and is not adherent. It is an unsatisfactory means of rendering the base particles non-caking. If the wax is softened, however, the particles of inert finely divided solid are wholly or at least partially embedded in the wax phase at the surface of the base particles. In other words the contacting of the base particles and the finely divided inert solid results in the latter particles being sunk into, forced into, etc. the surface of the base particles. Once embedded in the wax phase at the surface of the base particles they are held thereby the wax phase itself. In other words the particles of inert solid are, in effect, cemented into the surface of the base particles. As the tumbling continues additional particles of the inert solid are embedded in the surface of the base particles and finally the entire surface of the base particles is covered by a film of inert solid. Once this point is reached continued tumbling results in a thicker film, i.e., as a new particle of inert solid enters the surface of the base particle a previously embedded particle of inert solid at that location is displaced toward the center of the base particle.

The tumbling action also effects another desirable result as follows. A particle of inert solid embedded in the surface of the base particle may be wholly or partially embedded. If the latter, part of the inert solid particle protrudes from the surface of the base particle. This would tend to make a rough surface film. However, as a base particle containing such protruding portions of inert solid particles continues to tumble, the protrusions are broken off by contact with other particles and/or the walls of the tumbling apparatus. The result is that the final surface film of inert solid is very smooth.

The inert finely divided solid material is described in more detail as follows. It is described as finely divided because its particle size is smaller than the particle size of the base fertilizer particles. Although the size of the base particles can vary widely, for maximum commercial acceptance the size will normally be between 5 and 30 mesh. In other words, the base particles will pass a 5 mesh screen and be retained on a 30 mesh screen. Preferably they have a size of 8 to 20 mesh. The inert finely divided solid will, as stated, be smaller than the base particles and will normally be smaller than 40 mesh. Preferably the inert finely divided solid is smaller than 100 mesh.

The finely divided solid material is described as inert because it has no deleterious effect on the base particles, by chemical reaction or otherwise.

It will also be apparent that since the particles of the finely divided inert solid are embedded in the wax they must be harder than the wax at the temperature at which the embedding takes place. The hardness of wax is normally indicated as penetration in millimeters at 77° F. as determined by ASTM D-1321 (100 g., 5 sec.). The hardness of the inert finely divided solids suitable for the present purpose can also be indicated as penetration by this same test. Normally the penetration will be essentially zero although occasionally it will be about 0.5 mm.

Within the above limitations any particular solid material can be used. Examples of those suitable for the present purpose include diatomaceous earth, bentonite and other clays, calcium carbonate, aluminum hydroxide, glass, talc, cupric oxide, and the like. In a preferred embodiment of the invention the finely divided inert material is itself a fertilizer such as potassium sulfate or any of those mentioned previously. When the inert solid is a fertilizer the resulting surface film actually does more than render the base particles non-caking. It also contributes to soil nutrition. This of course is a distinct advantage. This preferred embodiment is discussed in more detail hereinafter.

It was mentioned previously that the tumbling is carried out at an elevated temperature sufficient to soften the wax phase of the base fertilizer particles. The temperature is described as elevated because it is above room temperatures (77° F.). On the other hand the temperature should not exceed the melting point of the wax phase of the base particles. Within these limitations the temperature required to soften the wax phase so that the inert solid particles will embed themselves therein can be rapidly determined for any specific base particle by one skilled in the art with a minimal amount of experimentation, but it cannot be specified in advance as a single temperature suitable for all the base particles to which the invention is applicable. The reason for this is that the actual temperature required to soften the wax so that the inert solid particles are embedded therein depends upon several variables. The most important variables are the melting point and hardness of the wax phase which in turn will depend mainly upon the type of wax used, and also, to a smaller extent, on the presence and type of additives in the wax. For example, a wax phase melting at 180° F. will require a higher tumbling temperature than a wax phase melting at 130° F. As another example, a microcrystalline wax melting at 150° F. might be soft enough for the present purpose only at 145° F. whereas a paraffin wax melting at 150° F. might be soft enough at 135° F. because of the inherently greater hardness of microcrystalline waxes. In general, however, the tumbling will be carried out at a temperature within 40° F. of the melting point of the wax phase of the base particles. In most cases the tumbling will be within 25° F., more frequently within 15° F. of the base particle wax phase melting point. As previously described the most preferred wax is a paraffin wax melting in the range of 110°-140° F. If such a wax is used the tumbling temperature will of course be below 140° F.

The amount of surface film applied to the base particles will vary somewhat depending upon, inter alia, whether the inert finely divided solid is itself a fertilizer or not. Regardless of the inert solid employed the amount thereof required to impart non-caking properties to base particles having a size of 5-30 mesh as specified supra is about 5-20%, preferably 10-20%, by weight of the final particles, the final particles being the base particles plus the surface film applied thereto. The amount of surface film applied is controlled, of course, by varying the tumbling time. Stated in another manner a surface film imparting non-caking properties to the base particles will usually have a thickness of 0.01-0.04 inch, preferably 0.015-0.030 inch.

If the inert finely divided solid is itself a fertilizer it may be desirable to have a film substantially thicker than that required to impart non-caking properties to the base particles in order to increase the amount of fertilizer ingredients in the final composition. For example, if the base particles contain 60 parts urea and 40 parts wax the urea content, i.e., the percentage of fertilizer in the base particles, is 60%. If a potassium sulfate film is applied thereto in the manner described herein so that the $K_2SO_4$ content of the final non-caking particles is 9%, then the percentage of fertiliber ingredients in the final particles is 64%, an increase of 6.7%. If, however, the film is thicker so that it is 33% of the final particles then the percentage of fertiliber ingredients in the final particles is 73%, an increase or 22%. In general, the amount of film applied using a fertilizer compound as the inert solid will be 5-40%, preferably 10-35%, by weight of the final particles.

The surface film has certain characteristics which are responsible for its ability to impart non-caking properties to the base particles. One is that it is adherent, i.e., it adheres to the base particles. This is due to the fact that in the tumbling operation the particles of inert finely divided solid become embedded in the wax phase of the base particles. The adherency of the surface film is readily appreciated by comparison with base particles which are dusted with an inert finely divided solid such as diatomaceous earth by shaking the particles with a quantity of earth and then separating the excess earth by screening. The resulting particles have a thin film of earth over their surface. This is a well known procedure for improving the anti-caking properties of particulate solids. When such earth dusted particles are rubbed between the fingers the earth immediately rubs off. When particles prepared by our invention are so rubbed, the surface film does not rub off, it remains intact.

The surface film is also described as continuous which means that for any given portion of the film there are essentially no imperfections in the film which result in part of the base particle surface being exposed. Stated otherwise there are essentially no discontinuities in the surface film. This is not the case with the film obtained by dusting the base particles with earth as described above. The term continuous also means that the film is essentially free of void space. The freedom from voids results in the film being strong and rigid so that when the particles are stored under pressure, e.g., a stack of bags of the particles 30 bags high, the film does not break and thereby expose the base particles.

The tumbing can be carried out in any convenient manner. For example, the base particles are charged to a rotating cylinder maintained at room temperature. Next the inert finely divided solid is charged to the cylinder. The base particles and the inert solid are tumbled for a few minutes after which the temperature within the tumbler is elevated in order to soften the base particle wax phase. Tumbling is then continued for another 15-20 minutes after which time all the base particles have a surface film thereon of the type described herein. The base particles are then removed from the tumbler. If any particles of inert solid were not embedded in the surface of the base particles they will be mixed with the non-caking base particles when the latter are removed from the tumbler. These loose particles of inert solid can be separated from the base particles by screening.

The heating during the tumbling can be effected in any convenient manner, one suitable method being to blow hot air through the tumbler. If desired the amount of hot air required can be reduced by preheating the inert solid.

In the above description of a suitable manner of carrying out the tumbling it was mentioned that the base particles and the inert solid particles were tumbled for a few minute at ambient temperature before raising the temperature to soften the wax phase of the base particles. The reason for this is as follows. The optimum tumbling temperature will often be about 10° F. below the melting point of the base particle wax phase. If the base particles were tumbled alone at this temperature they will sometimes be deformed, because of their contact with the walls of the tumbling apparatus, into pancake shaped particles. However, if the base particles are intimately mixed with the inert solid prior to tumbling at this same temperature, this deformation does not occur. This mixing can be effected, as described above, by tumbling at ambient temperature for a few minutes or, alternatively, the base particles and inert solid can be premixed at ambient temperature before being charged to the tumbling apparatus.

It was mentioned previously that the amount of wax phase in the base particles should be at least 25% by weight of the base particles. One reason for this not mentioned hereinbefore is that there must be sufficient wax phase for the particles of inert solid to embed themselves into. If, for example, there is only 10% wax phase in the base particles the amount of wax surrounding each fertilizer particle is so small that when such base particles are tumbled with inert solid by the method of the invention, the resulting particles are merely dusted with the inert solid. In other words no continuous, adherent film is obtained and the resulting particles are not non-caking.

It was also mentioned previously that the additive content of the wax phase should be less than 50% by weight of the wax phase. A reason for this not previously mentioned is that many additives, for example rosin, are extremely hard and upon heating although they do become softer they also become extremely sticky. If the wax phase contains more than 50% rosin the properties of the rosin predominate and when the base particles are heated they become sticky and agglomerate. Wax on the other hand does not become particularly sticky when it begins to soften and if the wax phase is mainly wax this property of the wax predominates. In other words if the wax phase is mainly wax, the undesirable properties of other additives such as rosin which would render the method of the invention inoperable are effectively masked.

The following examples illustrate the method of the invention more specifically.

EXAMPLE I

This example illustrates the preparation of the base particles used in the subsequent examples. 36 parts of a paraffin wax having a melting point of 129° F., a viscosity at 210° F. of 38 S.U.S. and a penetration at 77° F. of 18 mm. is charged to a mixing vessel equipped with heating and stirring means. The wax is heated to 240° F. To the wax are added 2 parts of polymerized wood rosin and 2 parts of asphalt. The rosin has been partially oxidized by heating at 140° F. for 3 days in the presence of air and at atmospheric pressure. The contents of the vessel are stirred until the rosin and asphalt dissolve in the wax. Next 60 parts of commercial crystal urea is added to the wax phase with stirring. This gross dispersion is then passed through a roller mill having a clearance small enough to subdivide the material passing therethrough to about 200 mesh. The discharge from the mill, a granular solid, is heated to 135° F. and thereupon becomes fluid. This fluid dispersion is molded into a plurality of particles substantially spherical in shape and having a diameter of about 1/16-inch. The particles pass an 8 mesh screen and are retained on a 20 mesh screen. The particles are divided into 9 portions, 1–9 inclusive, and are treated and/or tested as shown in the subsequent examples.

The test device used to measure the non-caking properties of the fertilizer particles is an aluminum block in which has been drilled a hole one inch in diameter and 4 inches long. The block has been stored in an oven at 110° F. for 8 hours prior to each test. The particles to be tested are poured into the hole to a depth of 2 inches. Next an aluminum rod 4 inches long and just slightly under one inch in diameter is fitted into the hole and allowed to rest upon the particles. The top of the rod is equipped with a plate so that by placing weights on the plate the pressure on the particles can be adjusted to any desired level. Next sufficient weights are placed on the plate so that the pressure on the particles, including that due to the weight of the rod and plate is 400 pounds per square inch. This is equivalent to the pressure on the bottom bag of a stack of 80 pound bags, 30 bags high and in which the area of each side of a bag in contact with an adjacent bag is 6 square feet. In other words, the large sides of the bags are, say, 2 feet by 3 feet.

The entire test device is then placed in an oven at 110° F. for 16 hours. After 16 hours the device is removed from the oven, the rod removed from the hole, and the aluminum block inverted so that the particles can fall out and be examined.

EXAMPLE II

Particles from Portion 1 are subjected to the above caking test with the following results. When the block is inverted no particles fall out. The bottom of the block is then struck sharply several times with a hammer but still no particles fall out. The particles are finally removed by means of a knife and appear as a single large lump. From the appearance of the lump it is obvious that the wax phase softened under the test conditions and all the particles congealed together.

EXAMPLE III

The particles in Portion 2 are dusted with diatomaceous earth by shaking the particles with a quantity of earth and then separating the excess earth by screening. The resulting particles have a thin film of earth over their surface. This is a well known procedure for improving the anti-caking properties of particulate solids. These earth dusted particles are then subjected to the above caking test. The results are the same as in Example I. This shows that the conventional dusting technique is an unsatisfactory procedure for rendering particles comprising a dispersion of solid fertilizer in solid wax non-caking.

EXAMPLE IV 100 parts of the particles of Portion 3 are charged to a tumbling vessel. The vessel is a hollow cylinder 6.5 inches long and 5 inches in diameter which rotates at 20 r.p.m. about its longitudinal axis, the latter being positioned horizontally. The cylinder contains 4 baffles mounted 90° apart on its inner surface. Each baffle is 1 inch wide and 6.5 inches long. The ends of the cylinder are covered by end plates, each plate having a small hole therein. One hole is a hot air inlet and the other hole is a hot air discharge. Means are provided for blowing hot air through the tumbler and a thermocouple is placed within the tumbler so that the temperature in the tumbler can be determined.

Next 9 parts of triple superphosphate having a particle size of 40–100 mesh are charged to the tumbler. The resulting mixture is tumbled at room temperature for 2–3 minutes after which the temperature in the tumbler is raised to 126° F. by blowing hot air therethrough. The melting point of the wax phase of the base particles is 135° F. Tumbling is continued at 126° F. for about 20 minutes after which all particles are removed from the tumbler. The particles are then shaken on a 40 mesh screen to remove any loose triple superphosphate but the amount thereof is essentially none.

The particles removed from the tumbler have a smooth adherent surface film. Several of the particles are cut in half with a sharp knife. A surface film of visible and uniform thickness is observed. The particles are analyzed and it is found that the surface film, i.e., the triple superphosphate content of the particles is 8%.

A group of the particles removed from the mold are subjected to the caking test described above with the following results. When the block is inverted all the particles immediately fall out. There is no agglomeration of the particles. This shows that the surface film imparts non-caking properties to the base particles.

EXAMPLE V

Using Portion 4 the procedure of Example IV is repeated except that 39 parts of triple superphosphate are used instead of 9 parts. The final particles contain 28% triple superphosphate. The results of the caking test are the same as in Example IV.

EXAMPLE VI

Using Portion 5 the procedure is the same as in Example IV except that the tumbling temperature is 110° F. instead of 126° F. and the tumbling time is 35 minutes instead of 20 minutes. The final particles contain 8% triple superphosphate and the results in the caking test are the same as in Example IV.

EXAMPLE VII

Using Portion 6 the procedure is the same as in Example IV except that instead of using 9 parts triple superphosphate 15 parts of KCl having a particle size of 100–200 mesh are used. The final particles contain 12% KCl. The results in the caking test are the same as in Example IV.

EXAMPLE VIII

Using Portion 7 the procedure is the same as in Example IV except that 30 parts urea having a particle size of 100–200 mesh are used instead of 9 parts triple superphosphate. The final particles contain 69% urea from which it can be calculated that the urea in the surface film is 22% of the final particles. The results in the caking test are substantially the same as in Example IV. There are a very few particles stuck together but they are readily broken apart.

EXAMPLE IX

Using Portion 8 the procedure is the same as in Example IV except that 15 parts of diatomaceous earth having a particle size smaller than 200 mesh are used instead of 9 parts triple superphosphate. The final particles contain 13% earth. The results in the caking test are the same as in Example IV.

EXAMPLE X

Using Portion 9 the procedure is the same as in Example IV except that 15 parts of calcium carbonate having a particle size of 80–100 mesh is used instead of 9 parts triple superphosphate. The final particles contain 13% $CaCO_3$. The results in the caking test are the same as in Example IV.

EXAMPLE XI

Particles having a composition the same as that shown in the last two lines of Table I, U.S. Patent 2,399,987 are prepared by the procedures described therein and then subjected to the caking test used in Examples II–X above. The results are essentially the same as in Examples II and III, i.e., all the particles are stuck together very strongly.

Substantially the same non-caking properties are obtained when other wax-containing fertilizer particles are used or when other finely divided inert solids are used.

The invention claimed is:

1. Method of rendering discrete solid fertilizer particles non-caking, said fertilizer particles comprising a dispersion of a solid fertilizer in a solid wax phase, said fertilizer particles containing 50–75% solid fertilizer and 25–50% solid wax phase, the percentages being by weight of said fertilizer particles, said solid wax phase containing at least 50% wax by weight of said wax phase, which comprises tumbling a mixture of said fertilizer particles and an inert finely divided solid, softening the wax phase of said fertilizer particles by conducting said tumbling at an elevated temperature below the melting point of said wax phase, whereby particles of said inert solid are embedded in the wax phase at the surface of said fertilizer particles, continuing said tumbling until essentially the entire surface of said fertilizer particles is covered by particles of said inert solid embedded in the wax phase thereof, whereby non-caking fertilizer particles are obtained, said particles containing a core of solid fertilizer dispersed in a solid wax phase, said core being overlaid with a thin continuous adherent film of said inert finely divided solid.

2. Method according to claim 1 wherein said inert finely divided solid is itself a fertilizer.

3. Method according to claim 2 wherein said film is 5–40% by weight of said non-caking fertilizer particles obtained.

4. Method according to claim 1 wherein said temperature is within about 25° F. of the melting point of said solid wax phase.

5. Method according to claim 1 wherein said temperature is within about 15° F. of the melting point of said wax phase.

6. Method according to claim 1 wherein said inert finely divided solid has a particle size of smaller than 40 mesh.

References Cited by the Examiner

UNITED STATES PATENTS

| | | | |
|---|---|---|---|
| 3,096,171 | 7/1962 | Woerther | 71—64 |
| 3,192,031 | 6/1965 | Zaayenga | 71—64 X |

DONALL H. SYLVESTER, *Primary Examiner.*

S. LEON BASHORE, R. BAJEFSKY,
*Assistant Examiners.*